US009556985B2

(12) United States Patent
Horgan (10) Patent No.: US 9,556,985 B2
(45) Date of Patent: *Jan. 31, 2017

(54) SYSTEMS AND METHODS FOR HINGE COUPLINGS

(71) Applicant: Tyco Fire Products LP, Lansdale, PA (US)

(72) Inventor: Michael W. Horgan, East Greenwich, RI (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,961

(22) Filed: Oct. 9, 2015

(65) Prior Publication Data

US 2016/0033064 A1    Feb. 4, 2016

Related U.S. Application Data

(63) Continuation of application No. 13/504,102, filed as application No. PCT/US2010/054123 on Oct. 26, 2010, now Pat. No. 9,169,952.

(Continued)

(51) Int. Cl.
*F16L 23/10* (2006.01)
*F16B 5/02* (2006.01)
(Continued)

(52) U.S. Cl.
CPC .............. *F16L 23/10* (2013.01); *F16B 5/0275* (2013.01); *F16B 35/02* (2013.01); *F16L 17/04* (2013.01);
(Continued)

(58) Field of Classification Search
CPC .................. F16L 23/08; F16L 23/10
(Continued)

(56) References Cited

U.S. PATENT DOCUMENTS 2,749,149 A    6/1956   Carpenter
2,752,174 A    6/1956   Frost
(Continued)

FOREIGN PATENT DOCUMENTS

DE    102011010655 B3 *  7/2012  ............ F16B 35/041
EP    0 501 148            9/1992
(Continued)

OTHER PUBLICATIONS

International Searching Authority, Written Opinion issued in International Application No. PCT/US10/054123, Dec. 23, 2010, 7 pages.
(Continued)

*Primary Examiner* — David E Bochna
(74) *Attorney, Agent, or Firm* — Perkins Coie LLP (57) ABSTRACT

A coupling for coupling pipe segments (2,4). The coupling includes a first housing component (12), a second housing component (14), and a fastener coupling the first and second components together. The fastener (22) has an aligned configuration defining an axis of alignment such that first and second housing components are in a closed configuration to define a central axis of the coupling. The fastener has a skewed configuration to define a pivot axis of the fastener such that the first and second housing components are in an open configuration. The pivot axis is substantially parallel to the central axis and substantially perpendicular to the axis of alignment.

15 Claims, 12 Drawing Sheets

Related U.S. Application Data (60) Provisional application No. 61/255,351, filed on Oct. 27, 2009.

(51) Int. Cl.
*F16B 35/02* (2006.01)
*F16L 17/04* (2006.01)
*F16L 37/124* (2006.01)

(52) U.S. Cl.
CPC ............... *F16L 37/124* (2013.01); *Y10T 16/52* (2015.01); *Y10T 16/558* (2015.01); *Y10T 137/0402* (2015.04)

(58) Field of Classification Search
USPC .................. 285/367, 366, 410, 411, 420
See application file for complete search history.

(56) References Cited

U.S. PATENT DOCUMENTS

| | | |
|---|---|---|
| 3,113,791 A | 12/1963 | Frost et al. |
| 4,702,499 A | 10/1987 | DeRaymond et al. |
| 5,348,414 A | 9/1994 | Dziuk et al. |
| 5,366,263 A | 11/1994 | Hendrickson |
| 5,380,052 A | 1/1995 | Hendrickson |
| 5,509,702 A | 4/1996 | Warehime et al. |

FOREIGN PATENT DOCUMENTS

| | | | | |
|---|---|---|---|---|
| EP | 0291331 | 11/1998 | | |
| FR | 1 196 266 | 11/1959 | | |
| WO | WO2011/056512 | 10/2010 | | |
| WO | WO 2015023022 | * | 2/2015 | ............. F16L 23/08 |

OTHER PUBLICATIONS

International Searching Authority, International Search Report issued in International Application No. PCT/US10/054123, Dec. 23, 2010, 5 pages.

European Application No. 10774383 dated May 4, 2015 from the EPO Patent Register.

U.S. Appl. No. 61/255,351, filed Oct. 27, 2009.

* cited by examiner

SYSTEMS AND METHODS FOR HINGE COUPLINGS

PRIORITY DATA & INCORPORATION BY REFERENCE

This application is a continuation of U.S. patent application Ser. No. 13/504,102, filed Jun. 25, 2012, which is application under 35 U.S.C. §371 of International Application No. PCT/US2010/054123 filed Oct. 26, 2010, which claims the benefit of priority to U.S. Provisional Patent Application No. 61/255,351, filed Oct. 27, 2009, each of which is incorporated by reference in its entirety.

TECHNICAL FIELD

This invention relates generally to pipe fittings and more specifically devices and methods for coupling fluid conveying piping or tubing.

SUMMARY OF THE INVENTION

Provided are preferred systems and methods for a hinged coupling. The preferred coupling for coupling two pipe segments together includes a first housing component having a first end, a second end, and an arcuate surface extending between the first and second ends of the first component. A second housing component having a first end, a second end, and an arcuate surface extends between the first and second ends of the first component. Each of the first ends of the first and second housing components having a through hole and a fastener disposed within the through holes. The preferred fastener has a first element and a second element to define a first configuration and a second configuration of the fastener. The first configuration of the fastener includes the first and second elements of the fastener being substantially aligned such that the through holes of the first ends of the first and second components are substantially aligned so as to define an axis of alignment extending through the through holes. The second configuration of the fastener comprises the first and second elements being skewed with respect to one another about a pivot axis that extends substantially perpendicularly to the axis of alignment.

A method is provided for assembling a pipe coupling that includes pivoting about a pivot axis a first fastener element disposed in a first end of a first housing component of the coupling relative to a second fastener element disposed in a first end of a second housing component of the coupling such that the first and second elements are disposed along a linear axis that is substantially perpendicular to the pivot axis so to bring interior surfaces of the first and second housing components opposed to one another to define a central axis of the coupling that runs substantially parallel to the pivot axis. The method further includes securing a second end of the first housing component to the second end of the second housing component.

In another preferred embodiment of a coupling for coupling pipe segments, the coupling includes a first housing component, a second housing component, and a fastener coupling the first and second components together. The fastener has a first element and a second element defining an aligned configuration including an axis of alignment such that first and second housing components are in a closed configuration so as to define a central axis of the coupling, the first and second elements of the fastener having a skewed configuration to define a pivot axis of the fastener such that the first and second housing components are in an open configuration. The pivot axis is substantially parallel to the central axis and substantially perpendicular to the axis of alignment.

In another preferred embodiment, a coupling for coupling pipe segments includes a first housing component and a second housing component. The first and second housing components have an open configuration and a closed configuration to define a central axis of the coupling. A fastener couples the first and second components together, in which the fastener has a first element engaged with the first housing component along a first engagement axis and a second element engaged with the second housing component along a second engagement axis. The first element is coupled to the second element such that the first and second elements of the fastener pivot with respect to one another about a pivot axis that is perpendicular to a plane defined by at least one of the first and second engagement axes. The pivot axis is substantially parallel to the central axis of the coupling and defines the pivot axis about which the first and second housing components pivot relative to one another between the open and closed configuration.

In one preferred embodiment of a coupling, the coupling includes a first housing component having a first through hole and a second housing component having a second through hole. A fastener having a first fastener element is engaged with the first housing component and a second fastener element engaged with the second housing component, the fastener coupling the first and second components together so that the first and second housing components pivot with respect to one another. Preferably the fastener has a cast fit within the through holes.

In yet another embodiment, a fastener is provided that includes a first element and a second element, each of the first and second elements having an enlarged head portion and a shank portion depending from the head portion along a longitudinal axis. The head portion of each of the first and second elements including a through hole to define a pivot axis. A pin disposed in the through holes of each head portion of the fastener to couple the first element to the second element such that the head portions of the first and second elements pivot with respect to one another about the axis.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

DETAILED DESCRIPTION

Figure 1:
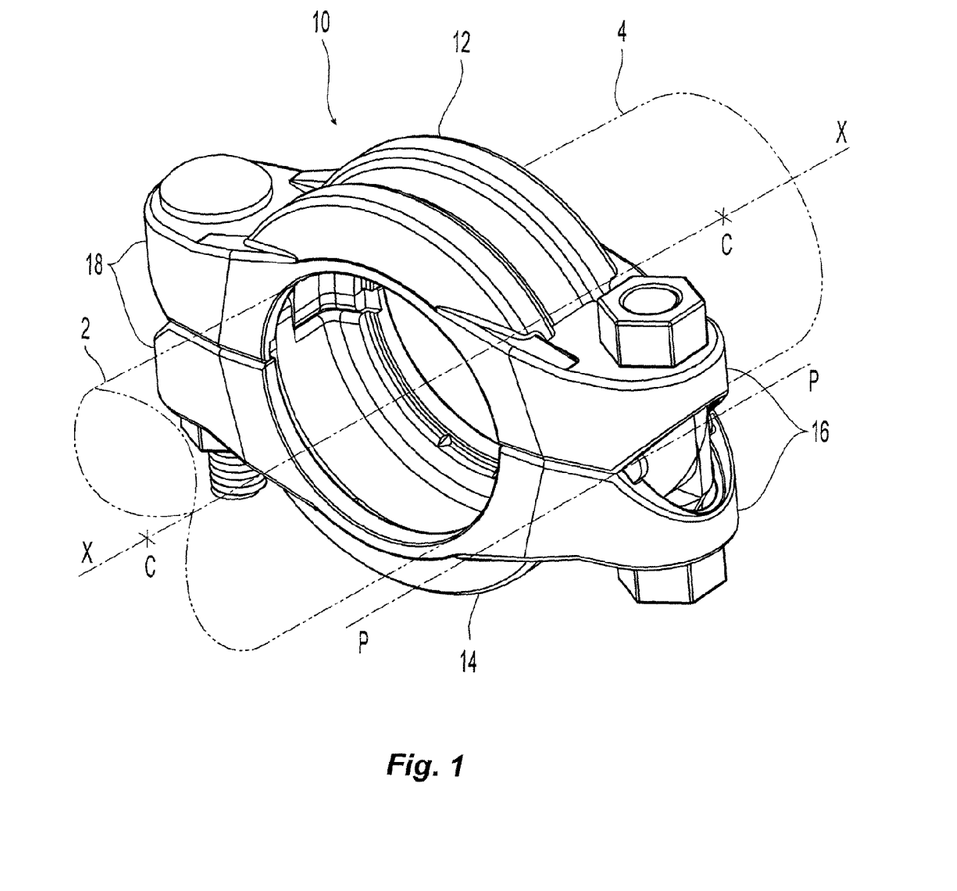
FIG. 1 is a perspective view of a preferred coupling.

Shown in FIG. 1 is a preferred embodiment of a hinged coupling 10 secured about two preferably grooved pipe segments 2, 4 so as to couple the pipe segments 2, 4 together along a pipe axis X-X. The preferred coupling includes two housing components 12, 14 which surround a gasket (hidden) to form a fluid tight seal about the end of the pipe segments 2, 4. More specifically, the preferred coupling 10 includes an upper housing 12 and a lower housing 14 each of which is preferably dimensioned to cradle and house approximately one-half of the pipe assembly. Alternatively, the coupling 10 could include more than two housing components provided adjacent components could be coupled together in a hinged arrangement as described herein.

The coupling 10 includes a coupled end 16 and a preferably diametrically opposed securement end 18. The coupling 10 is preferably preassembled for the user such that at the coupled end 16, the upper housing 12 is coupled to the lower housing 14 by the manufacturer before delivery to the end user. The housing components 12, 14 additionally pivot with respect to one another about a pivot axis P-P located at the coupled end 16. Accordingly, a user can place the coupling 10 in an open configuration, as seen for example in FIG. 2, locate the lower housing component 14 about the ends of the pipe segments 2,4 and pivot the upper housing 12 with respect to the lower housing component 14 so as to enclose the ends of the pipe segment therebetween in the closed configuration of FIG. 1. At the securement end 18, the housing components 12, 14 are secured together such that the housing components 12, 14 cannot pivot with respect to one another and a fluid tight seal is formed about the pipe end segments 2, 4.

Figure 2:
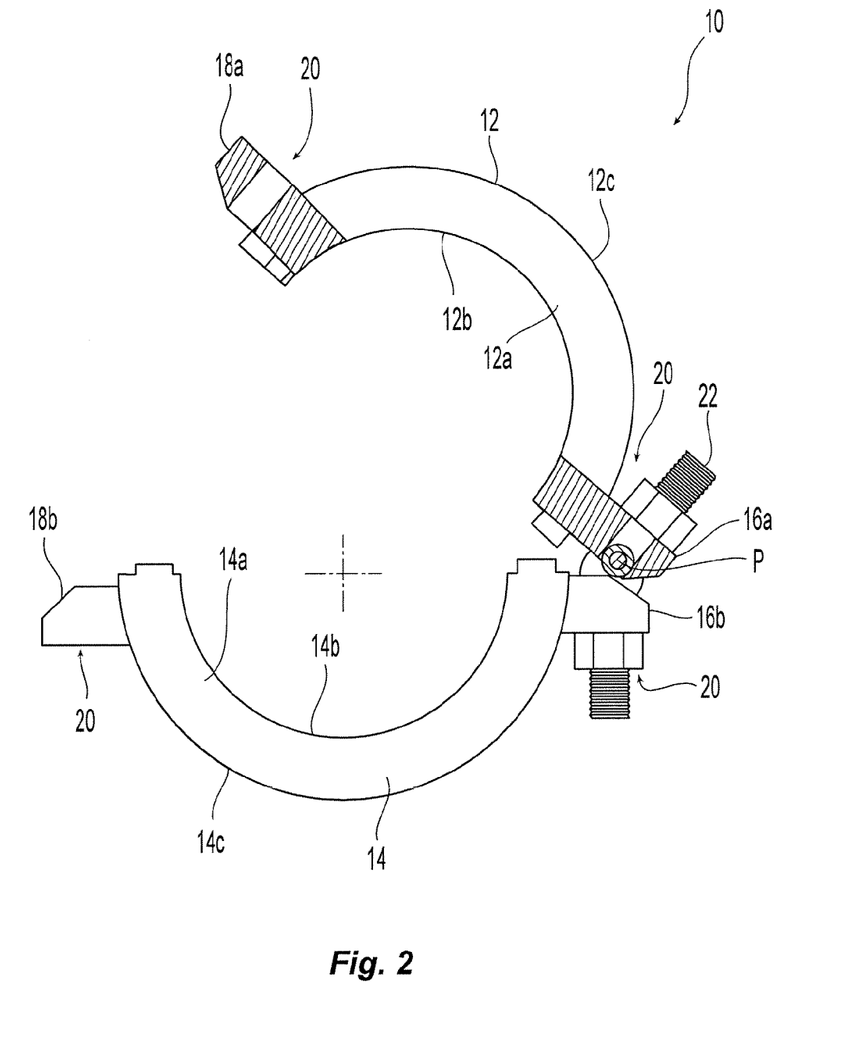
FIG. 2 is a partial cross-sectional view of the coupling of FIG. 1

Shown in FIG. 2 is the coupling 10 in a partially cross-sectional view. In this embodiment, each of the lower and upper housing components 12, 14 are similarly configured. More specifically, the upper housing component 12 includes a first end 16a, a second end 18a with a preferably substantially arcuate segment 12a extending between the first and second ends 16a, 18a. Similarly, the lower housing component 14 includes a first end 16b, a second end 18b, with a preferably arcuate segment 14a extending between the first and second ends 16a, 18a. With the housing components in their closed configuration, the arcuate segments are opposed to define a center axis C-C of the coupling 10. Each of the arcuate segments 12a, 14a have an interior surface 12b, 14b defining a gasket cavity for engaging and housing a gasket seal. Each of the arcuate segments 12a, 14a define the outer peripheral surface segment 12c, 14c of the arcuate segments. Preferably, the peripheral surfaces 12c, 14c of the housing components together define an arcuate to substantially circular profile, but other geometric profiles are possible such as polygonal with multiple linear lines.

Each of the first end 16a, 16b and the second end 18a, 18b of the first and second housing components 12, 14 is preferably defined by a bolt pad extension having a recess and more preferably a through hole 20 for receipt of one end of a fastener to couple the housing components together at each of the coupling end 16 and securement end 18. Shown in FIG. 2 is a preferred pivot fastener 22 engaged or disposed within the through holes 20 of the bolt pads at the first ends 16a, 16b of the upper and lower housing components 12, 14. In addition to coupling the housing components 12, 14 together, the pivot fastener 22 provides for relative pivoting motion between the upper and lower housing components 12, 14 about a pivot axis P that preferably runs parallel to the central axis C of the coupling 10. Because the housing components 12, 14 in this embodiment are identical and preferably symmetrical, the preferred pivot fastener 22 can be installed in either of the two ends 16, 18 of the coupling 10 such that either end of the coupling can serve as the coupling end 16 and the opposite end could serve as the securement end 18. Preferably disposed within the through holes 20 of the second ends 18a, 18b of the housing components 12, 14 would be another fastener, preferably a fixed straight bolt secured by a nut (not shown) in order to maintain the coupling 10 in the closed configuration.

Figure 3A:
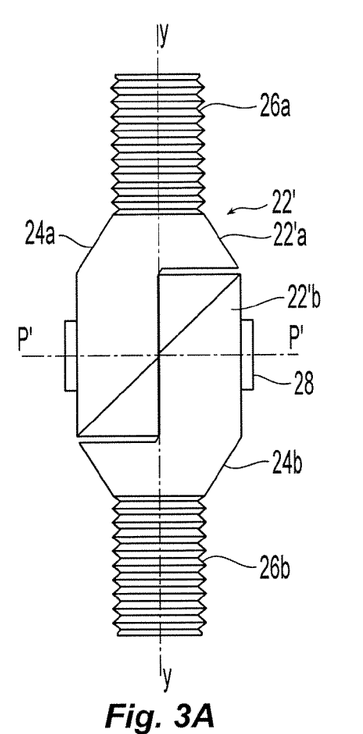
FIG. 3A is a preferred embodiment of a fastener for use in the coupling in FIG. 1.
Figure 3B:
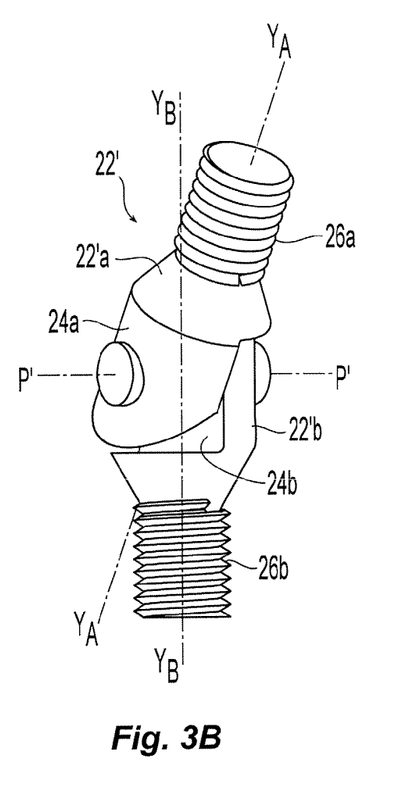
FIG. 3B is a perspective view of the fastener of FIG. 3A.

Shown in FIGS. 3A and 3B is a preferred pivot fastener 22'. The preferred pivot fastener 22' preferably includes a first element 22'a and a second element 22'b coupled or engaged with the first element 22'a such that the elements 22'a, 22'b can pivot with respect to one another to define two or more configurations. For example, shown in FIG. 3A are the first and second elements 22'a, 22'b in a first configuration in which the elements 22'a, 22'b are substantially axially aligned along axis Y-Y, and shown in FIG. 3b the elements 22'a, 22'b are pivoted relative to one another such that first element 22'a extending along axis YA-YA is skewed with respect to the second element 22'b extending along axis YB-YB.

Figure 3C:
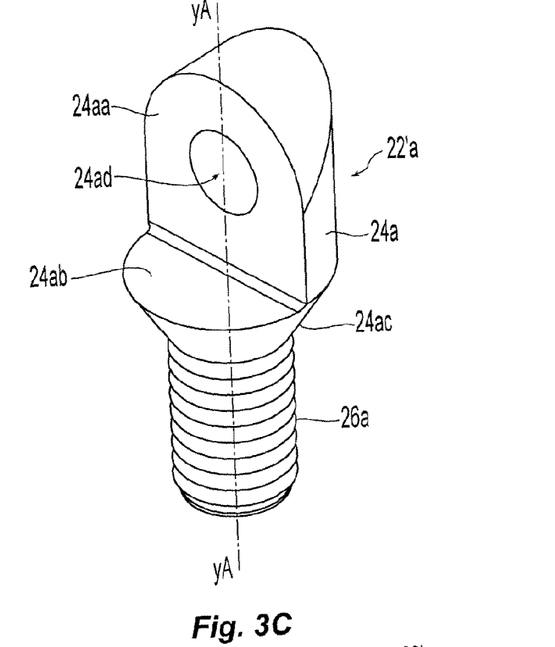
FIG. 3C is a perspective view of an element in the fastener of FIG. 3A.

The first and second elements 22'a, 22'b are preferably substantially identical. Shown in FIG. 3C is a preferred element 22'a. Each of the elements 22'a, 22'b of the fastener have a preferably enlarged head portion 24a and a shank portion 26a depending from the head portion 24a along the longitudinal axis YA-YA of the element 22'a. The head portions 24a, 24b preferably engage or cooperatively operate with one another to define the pivoting relationship between the first and second elements 22'a, 22'b. In one particular preferred embodiment, the head portion 24a includes a first planar bearing surface 24aa located in a plane that includes the central longitudinal axis of the element 22'a. The head portion 24a further preferably includes a second planar shoulder surface 24ab that extends perpendicular to the first planar bearing surface 24aa. Transitioning from the enlarged head portion 24 to the preferably narrower shank portion 26a of the elements 22'a is a preferred frustoconical transition portion 24ac. The transition portion 24ac can define an alternate geometry such as for example, circular cylindrical or a step transition from the head portion 24a to the shank portion. The shank portion is 26a is preferably threaded for securing the fastener 22' within the bolt pad ends 16, 18 of the coupling housing components 12, 14.

Figure 3D:
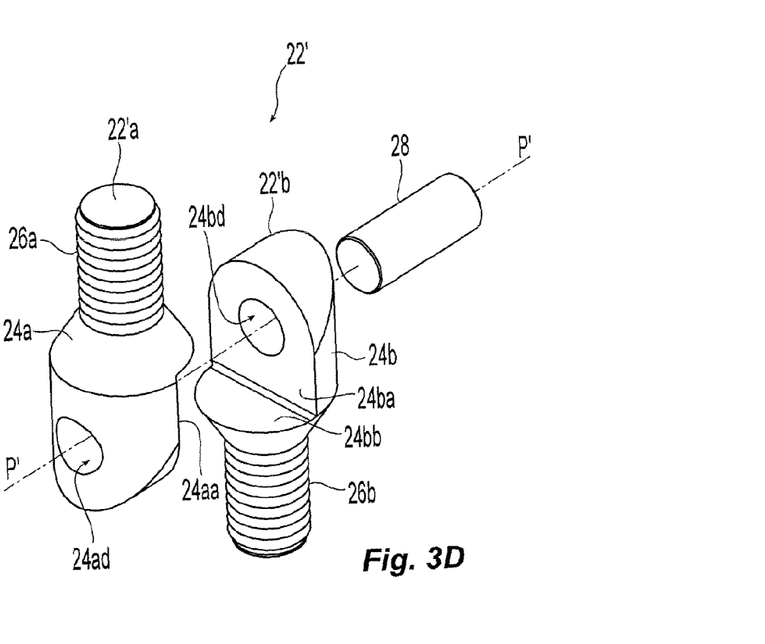
FIG. 3D is an exploded view of the fastener of FIG. 3A.

Shown in FIG. 3D is an exploded assembly view of the preferred pivot fastener 22'. In the assembly, the planar bearing surfaces 24aa, 24ba of the elements 22'a, 22'b engage one another to define at least a line of contact in the plane that includes the central longitudinal axis of the pivot axis fastener. To secure the two elements together, the preferred fastener 22' includes a pin element 28 that is disposed within through holes 24ad, 24bd formed in each of the head portions 24a, 24b of the elements 22'a, 22'b to define a pin axis P'-P'. The through holes 24'ad, 24'bd preferably extend orthogonally through the first planar bearing surfaces 24aa, 24ba in each element 22'a, 22'b. The elements 22'a, 22'b rotate or pivot with respect to one another about the pin 28 and its axis P'-P'. Referring again to FIG. 3A, the assembled preferred pivot fastener 22' includes two preferably threaded ends 26a, 26b that are opposed about an enlarged central portion 24a, 24b along the longitudinal axis Y-Y in the axially aligned configuration of the pivot fastener 22'. The central portion 24a, 24b preferably defines a substantially circular cylindrical outer surface geometry. Alternatively, the central portion 24a, 24b could be rectangular cylindrical or cubical. The pin 28 preferably defines an axial length that is greater than the width of the central portion 24a, 24b such that the ends of the pin 28 protrude beyond the through hole openings 24ad, 24bd of the respective head portions 24a, 24b of the elements 22'a, 22'b. Alternatively, the pin 28 could be integrally formed on one element 22'a to be received in a through hole or recess formed on the other element 22'b. Further in the alternative, the each of the elements 22'a, 22'b can be formed so as to have corresponding structures that engage and cooperate with one another such that the elements 22'a, 22'b can pivot with respect to one another in a manner as described herein.

Figure 4A:
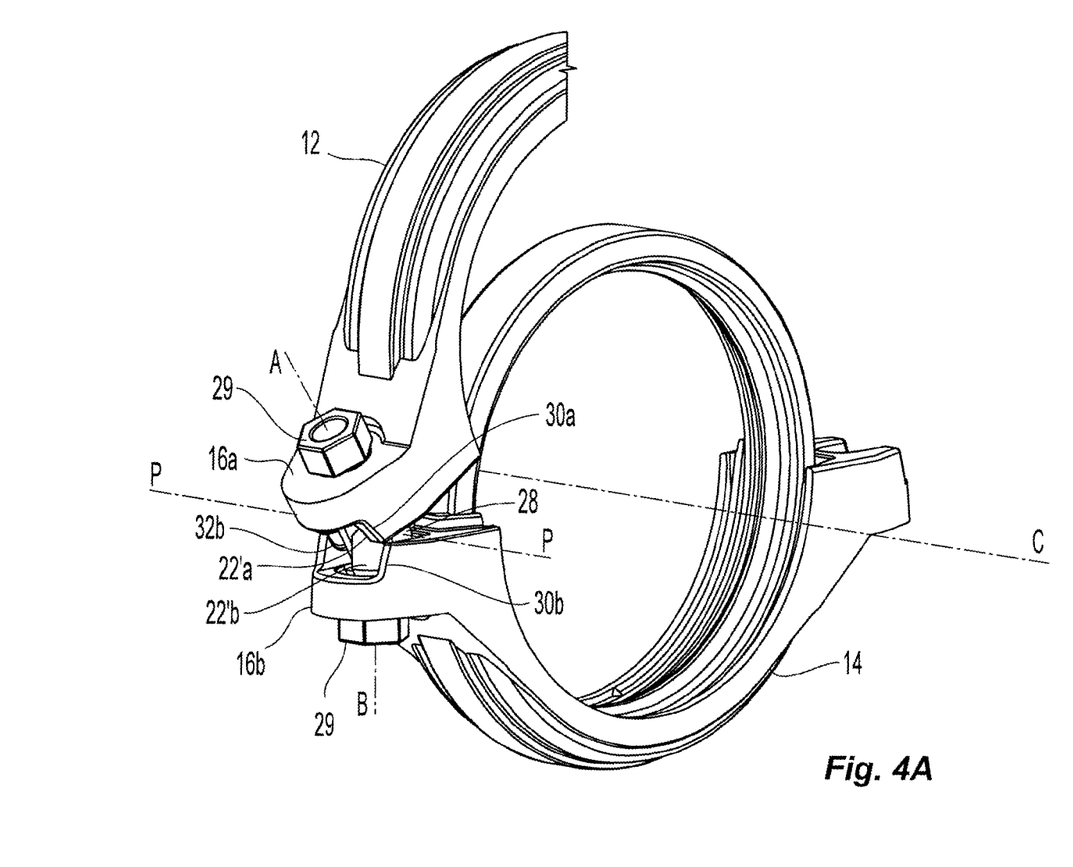
FIG. 4A is a perspective view of another preferred coupling.

As described above, the fastener 22 is preferably secured within the through holes 20 of the bolt pads formed at one of the ends 16, 18 of the housing components 12, 14 to provide the coupling 10 with a housing in which the components 12, 14 are coupled together at one end and yet pivot with respect to one another about an axis P-P. Shown in FIG. 4A is another view of the preferred coupling 10 assembly in an open configuration with the preferred the pivot fastener 22' secured at the coupling end 16. Each end of the preferred fastener pivot 22' is secured within the through hole 20 of the bolt pad extensions 16a, 16b of the respective upper and lower housing components 12, 14. To secure the fastener 22', a nut 29 is disposed about the threaded shank 26a, 26b of each element 22'a, 22'b of the fastener 22'. With the fastener 22' installed, the central portion 24 of the fastener is located between the housing components 12, 14 such that the pin 28 pivot and its axis of the P'-P' is disposed parallel to the central axis CC of the coupling 10 to thereby define the pivot axis P-P for the coupling assembly.

Figure 5A:
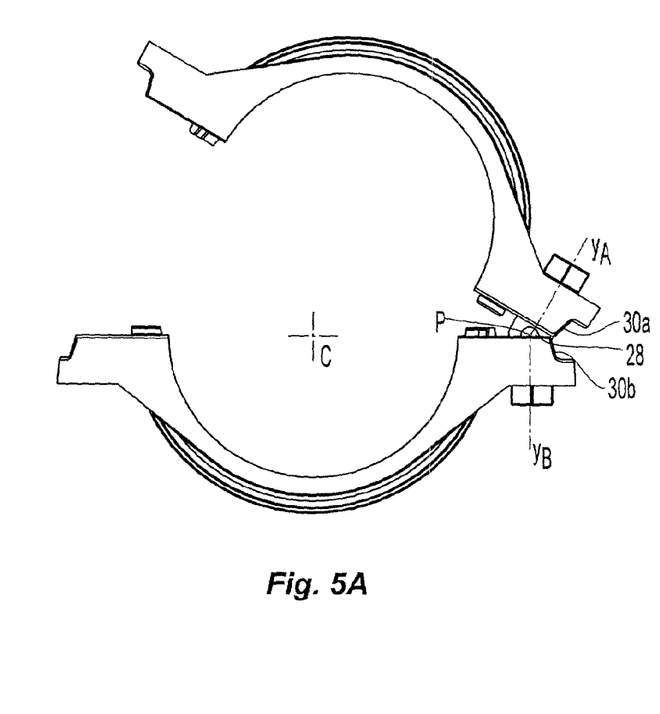
FIG. 5A is an open configuration view of a preferred coupling.
Figure 5B:
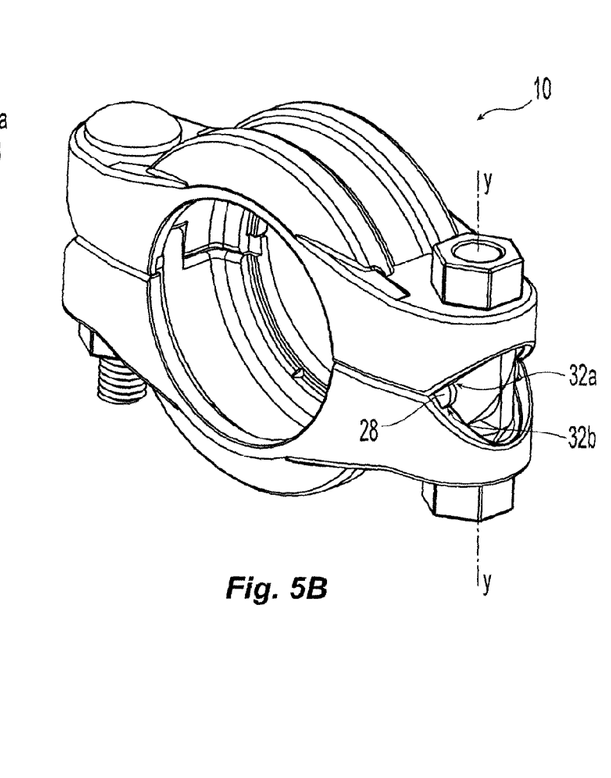
FIG. 5B is a perspective view of a preferred coupling in a closed configuration.

With the fastener 22' properly located and disposed within the through holes 20 of the bolt pad extensions end 16a, 16b, the housing components can pivot with respect to one another about the pivot axis P-P to go from the open configuration, as shown for example in FIG. 5A to the closed configuration shown in FIG. 5B. In the closed configuration of the coupling 10, the fastener 22' is preferably disposed such that the through holes 20 are substantially axially aligned, and in the open configuration, the fastener 22' is disposed such that the through holes are skewed with respect to one another. The range of angles through which the housing component may pivot with respect to one another is preferably only limited by the angular range over which the two elements 22'a, 22'b can pivot with respect to one another and the interference between the housing components over that angular range. Referring back to FIG. 3B, the first element 22'a has a preferred angular range of rotation about 180° degrees and more preferably 210° degrees about the fastener pivot axis P'-P' relative to the second element 22'b. Accordingly, the upper component 12 preferably pivots through a corresponding range of angular rotation about the pivot axis P-P with respect to the lower housing component 14.

To minimize the interference between the housing components and to maximize the relative range of motion, the bolt pad extensions ends that house the pivot fastener 22' have an angled notch at the outer edge of the bolt pad extension 16a, 16b in the area that defines through hole 20. For example, referring to FIGS. 4A and 5A, the bolt pads taper narrowly at the outer perimeter edge of the housing ends 16a, 16b to define the angled surface 30a, 30b. The angled surfaces provide for a preferred notch or gap about the pivot axis P-P through which the housing components 12, 14 can rotate relative to one another without interference.

In order to facilitate the relative motion between the housing components 12, 14 and closed sealed configuration of the coupling 10 about the pipe segments, it is desirable for the relative pivot motion between the housing components 12, 14 to occur in a common plane. Accordingly, the preferred coupling assembly 10 provides that relative rotation between the components about an axis YA-YA, YB-YB extending along a through hole 20 is minimized or more preferably eliminated. In the preferred coupling 10, the pivot fastener 22' engages the interior surface of the bolt pad extension end 16a, 16b such that the components cannot rotate relative to one another about an axis YA-YA, YB-YB extending through the through hole 20 of the bolt pad extension 16a, 16b housing the fastener 22'. In the assembled coupling of FIG. 4A and as seen in FIG. 5B, the exposed ends of the pin 28 are located within the recesses 32a, 32b formed in the interior surface of the bolt pad extensions 16a, 16b which define the through holes 20. Any tendency for the housing components 12, 14 to rotate relative to one another is minimized or eliminated by the interaction of the exposed ends of the pin 28 and the interior surface defining the recess 32 which hold the exposed ends of the pin 28.

Figure 6A:
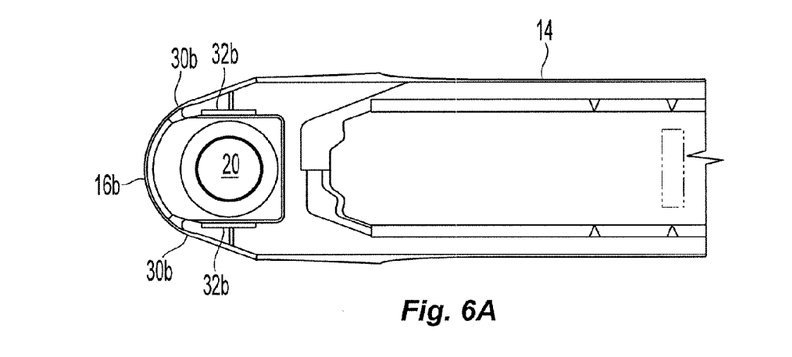
FIG. 6A is a plan view of a preferred bolt pad extension of a coupling housing component.
Figure 6B:
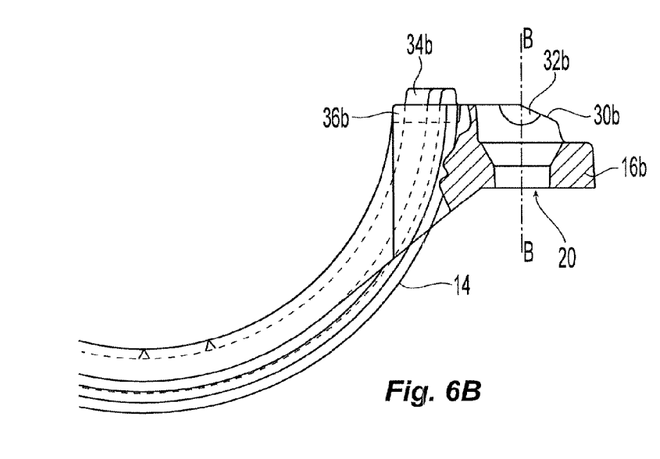
FIG. 6B is an elevation view of the preferred bolt pad extension of FIG. 6A.
Figure 6C:
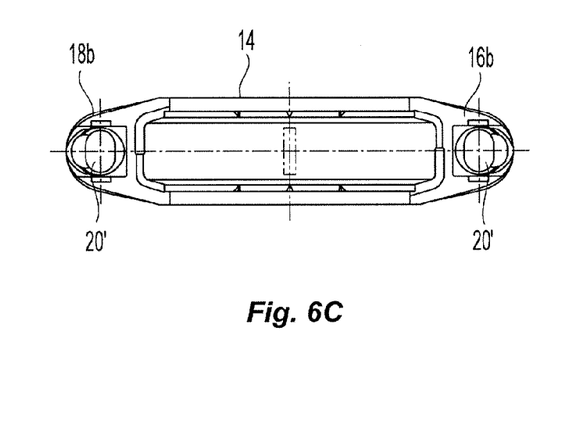
FIG. 6C is a plan view of another preferred bolt pad extension of a coupling housing component.

Shown in FIGS. 6A and 6B are plan and cross-sectional views of a preferred bolt pad extension. In this illustrative example, the bolt pad extensions 16b for lower housing component 14 is being shown, but the opposite bolt pad extension end 18b can be similarly configured as could the bolt pad extensions 16a, 18a of the upper housing component 12. In the plan view of FIG. 6A, the through hole 20 is shown, and proximate the opening to the through hole 20 are the recesses 32b diametrically opposed about the opening to engage the exposed ends of the pin 28 in the preferred pivot fastener 22'. Shown in the cross-sectional view of FIG. 6B, the recess 32b defines a partially semicircular geometry, although other geometries for the recess 32b could be chosen provided the recesses were properly located to at least partially house and engage the exposed ends of the pin 28. With regard to the geometry of the through hole 20, cross-sectional area of the through hole 20 preferably varies along its axis of elongation B-B or may alternatively be constant provided that the opening can accommodate the desired fastener for coupling the housing components 12, 14 and/or provide their relative pivot motion about the pivot axis P-P. For example, as shown in FIG. 6C, is another preferred housing component 14 that includes, at both ends 16b, 18b through holes 20' that define an oval geometry to engage a correspondingly shaped portion of a fastener to prevent the fastener from spinning within through hole 20. Thus, a nut can be threaded about the oval shaped fastener with only one hand.

Due to the preferred symmetrical configuration of the housing components, as noted above, the preferred coupling pivot fastener 22 can be installed on either end 16, 18 of the coupling 10. Moreover, because of the preferred common configuration of the housing components, a single housing component can serve as either the upper housing component or the lower housing component. Having a single symmetric housing component design may be desirable so as to eliminate the need to manufacture or inventory additional housing components for the coupling assembly. Additionally, the single housing component design may eliminate assembly errors by avoiding mismatching and improper assembly of dissimilar parts that require a specific orientation. The housing components 12, 14 can include additional features to facilitate their assembly, for example as shown in FIG. 6B. the lower housing component 14 may include a tongue 34b and recess 36b on each end for mating respectively with a corresponding recess and tongue in the upper housing. The tongue and recesses are preferably located radially inward of the bolt pad through holes 20 relative to the center C of the coupling 10. Details of the tongue and recess are shown and described in U.S. Pat. No. 6,139,069 which is incorporated by reference in its entirety.

The preferred use of the pivot fastener can simplify manufacturing of the coupling 10. Because the preferred pivot fastener 22' provides for the pivot action of the coupling, and thus the precision fit and tolerances are in the pivot fastener, there is no need to machine the component housings 12, 14 to form the hinged connection. Accordingly, the coupling 10 can employ a cast fit between the fastener 22' and the housing components 12, 14. As such, the substantial axial alignment or substantial perpendicular orientation between components and elements of the coupling 10 only requires the components to be sufficiently aligned or oriented perpendicular to one another to provide the desired configurations of the coupling.

Figure 7A:
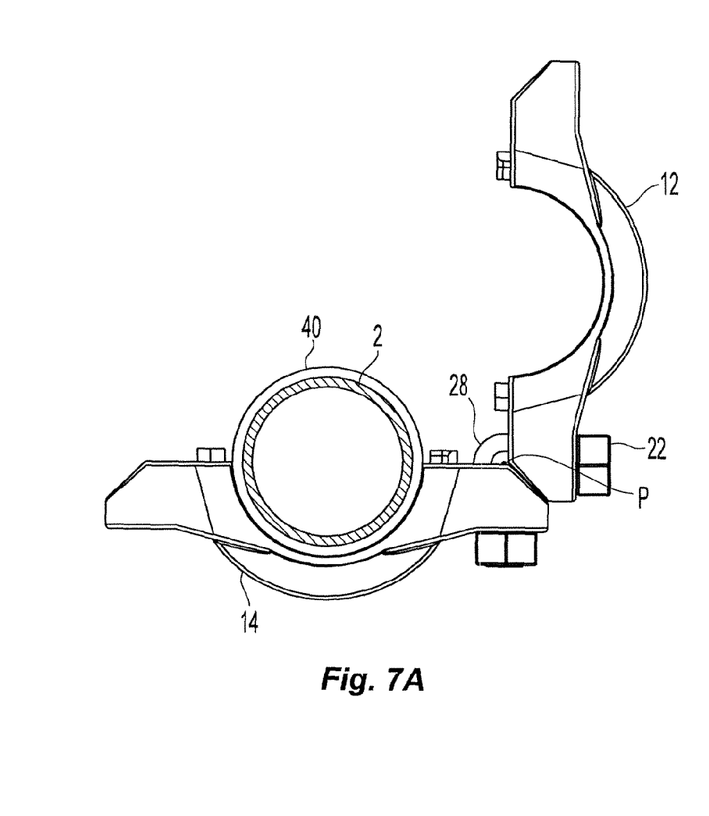
FIG. 7A is a preferred coupling in an open assembly configuration.
Figure 7B:
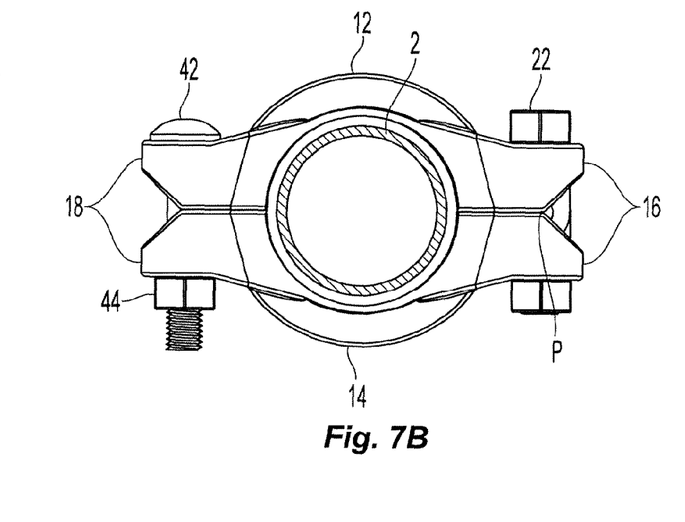
FIG. 7B is the preferred coupling in FIG. 7A in a closed configuration.

Preferably, the coupling 10 is preassembled with the pivot fastener 22 installed and the upper and lower housing components 12, 14 coupled together. Shown in FIGS. 7A-7B, is a preferred method of joining pipe or tube segments together using the preferred coupling 10. A gasket seal 40 is disposed over the ends of the pipe segments 2, 4 as shown in the end view of FIG. 7A (illustratively shown in cross-section in FIGS. 9A and 9B). With the fastener 22 preferably in the skewed configuration such that the coupling 10 is in the fully open configuration, the lower housing component 14 is brought into engagement with the gasket 40 so as to be received within the housing recess defined by the inner surface 14c of the lower housing component 14. The upper housing component 12 is pivoted about the pivot axis P-P, relative to the lower housing component 14 so as to bring the coupling 10 to a closed configuration about the coupling 40 such that the fastener 22 and the through holes 20 in which the fastener is disposed are in the axially aligned configuration. In order to fully seal and form the pipe joint, a separate second fastener 42, a bolt 42 is inserted and disposed within the axially aligned through holes 20 of the securement end 18 of the coupling 10 opposite the coupled end 16. A nut 44 is threaded onto the threaded shank of the bolt 42 and secured onto the bolt at an amount ranging from about thirty to about two hundred-fifty foot-pounds (30-250 ft.-lbs) of torque, preferably depending upon the size of the coupling.

Because the preferred coupling is preassembled, the preferred pivot fastener 2T is secured or partially secured at its ends by threaded nuts 29. The nuts 29 are preferably fastened and secured about the threaded shank portions 26a, 26b of the fastener 22' at amount of about 60-100 ft-lbs. of torque or at an amount of torque to provide a fastened and secure engagement about the threaded shank portions 26a, 26b. Alternatively, the ends 26a, 26b of the fastener 22' can be secured to the housing components 12, 14 by other techniques such as by press fit, staking the ends 26a, 26b in place, or using formed ends with other securing structures, i.e. pins, so long as the fastener is properly secured and located within the through holes 20 of the bolt pad extensions 16a, 16b and the coupling can satisfy a desired hydrostatic pressure and bending moment rating.

Figure 8A:
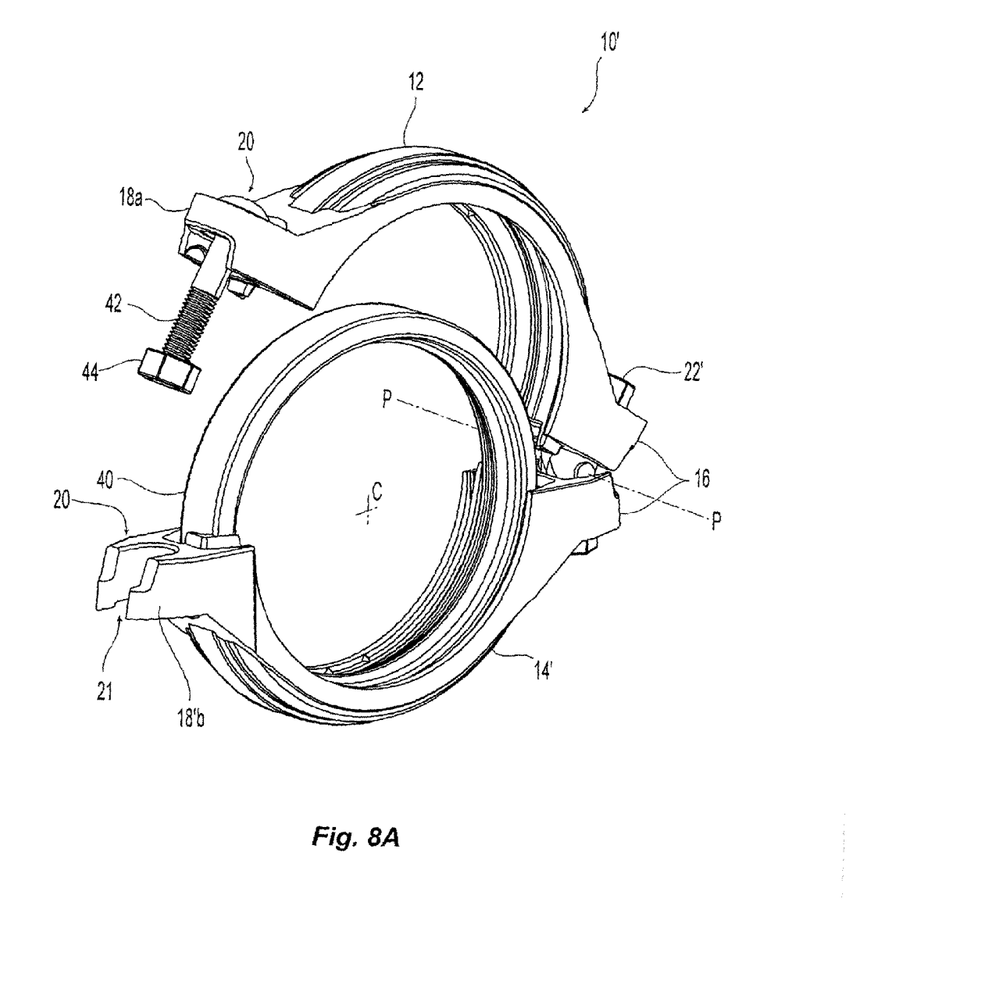
FIG. 8A is another preferred coupling in an opened configuration.
Figure 8B:
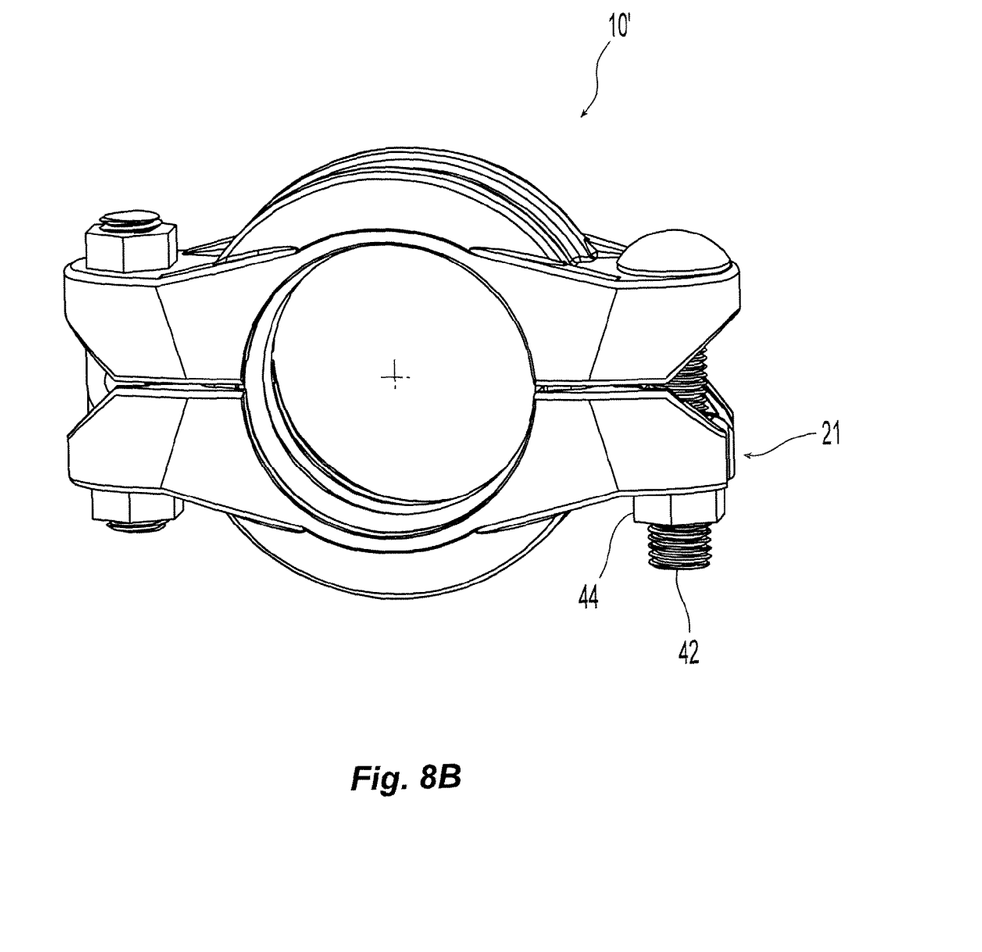
FIG. 8B is the coupling of FIG. 8A in a closed configuration.

The above described embodiment of coupling 10 was sealed using a separate fastener 42 that is installed and secured by the end user. In order to provide a more preferably fully pre-assembled coupling device, shown in FIGS. 8A & 8B is an alternate embodiment of the coupling 10'. In this alternative embodiment the securement end 18 of the coupling 10' is configured to provide a pre-assembled fastener 42 assembly. The pre-assembled preferred coupling 10' still includes at its coupled end 16 a fastener 22, preferably pivot fastener 22' that couples the upper housing component 12 and lower housing component 14 together and providing a pivot axis P-P about which the component pivots relative to one another. Although the upper housing component 12 is configured as previously described, the lower housing component 14' preferably includes a slot 21 at the securement end 18. The slot 21 is in communication with through hole 20 of the bolt pad extension end 18b and preferably includes a peripheral slot opening located at the outer lateral edge of the housing component 14'. With the slot opening and slot 21 in the lower housing, a fastener assembly in the form of a combined bolt 42 and nut 44 can be disposed within the through hole 20 of the bolt pad extension end 18a of the upper housing component 12. With the slot 21 in communication with the through hole 20, the bolt pad extension 18b' provides an elongated or preferably oval shaped opening to engage a correspondingly shaped portion of the bolt to prevent the bolt spinning within the through hole 20.

The pre-assembled coupling 10' eliminates the need for the end user to insert a separate bolt in the securement end 18 of the coupling and secure a nut about the end of the fastener 42. Instead, the end user can locate the coupling 10' about the gasket 40 that is disposed about the aligned pipe segments 2, 4. The coupling is then brought to a closed configuration as shown for example in FIG. 8B. The fastener assembly 42, 44 can be positioned out of the way to allow the housing components to pivot to the closed position. Once in the closed configuration, the fastener assembly 42, 44 can be inserted through the slot 21 and its opening into position in the through hole 20. The nut 44 is then tightened to the desired torque values and the pipe joint can be placed into service. Although the slot 21 and its peripheral opening are described with respect to the lower housing 14', it should be understood that the alternate housing component 14' could be used as the upper housing component of the coupling assembly 10. In such an instance, the fastener assembly 42 can be pre-assembled within the through hole 20 of the lower housing component.

The above preferred coupling assemblies are preferably configured for joining nominal two inch (2 in.); 2½ inch; three inch (3 in.); four inch (4 in.); six inch (6 in.); or eight inch (8 in.) pipe or tubing, but may be configured to join any size pipe or tubing provided the housing components are configured to hold and secure the pivot fastener 22. In each of the preferred coupling assemblies described above, the pivot fastener 22 in combination with the securement fastener 42 provides sufficient distributed compression force through the housing components about the gasket 40. The inner surfaces 12a, 14a, of the upper and lower housings components 12, 14, which engage the gasket 40, preferably define a profile to maximize and/or maintain a sufficient compressive force against the gasket so as to maintain an effective seal at the pipe joint.

Figure 9A:
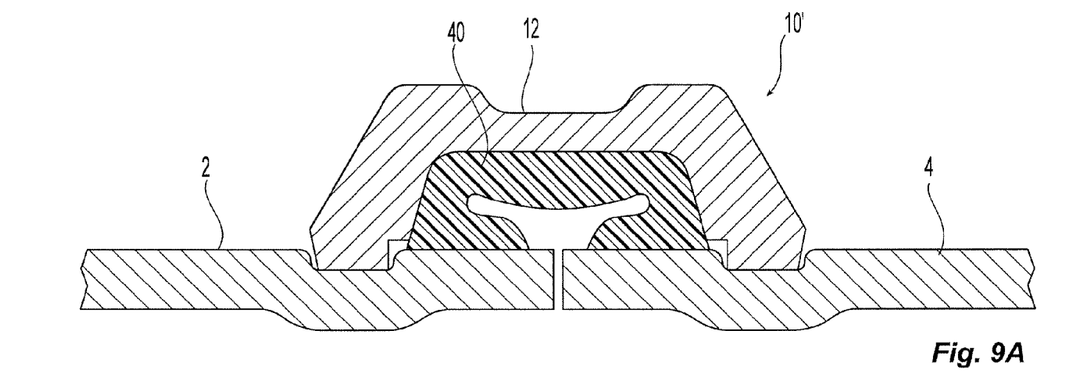
FIG. 9A is a partial cross-sectional view of preferred coupling assembly in a pipe joint using C shaped gasket.
Figure 9B:
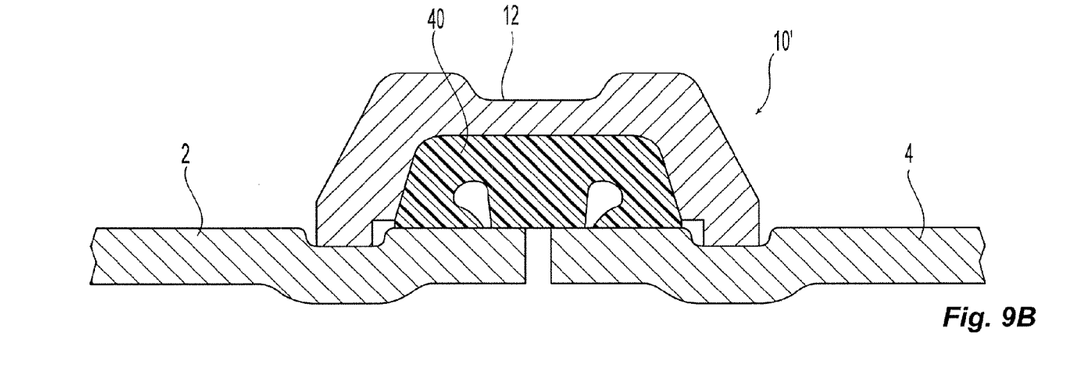
FIG. 9B is a partial cross-sectional view of preferred coupling assembly in a pipe joint using a Tri-seal gasket.
Figure 10A:
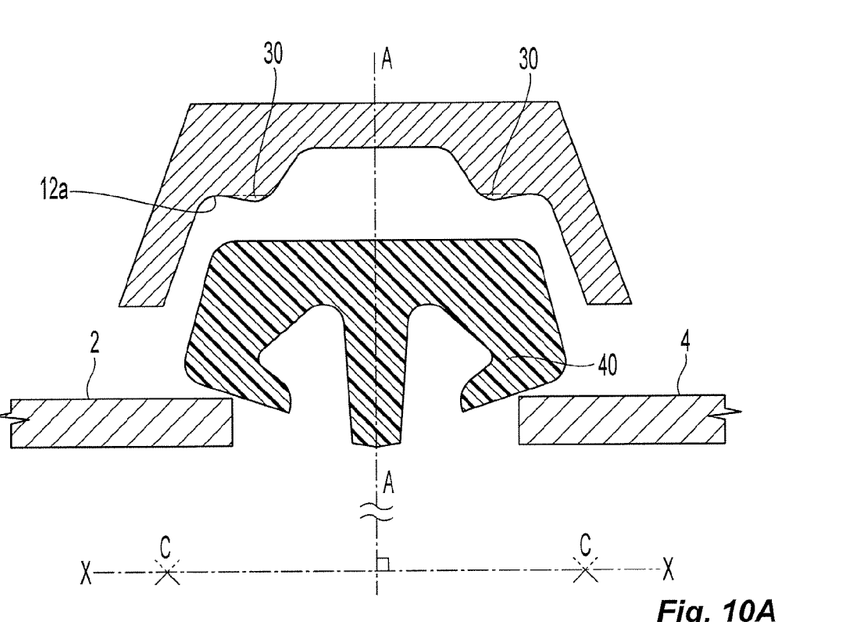
FIG. 10A is a partial uncompressed schematic view of a preferred coupling housing and gasket arrangement.
Figure 10B:
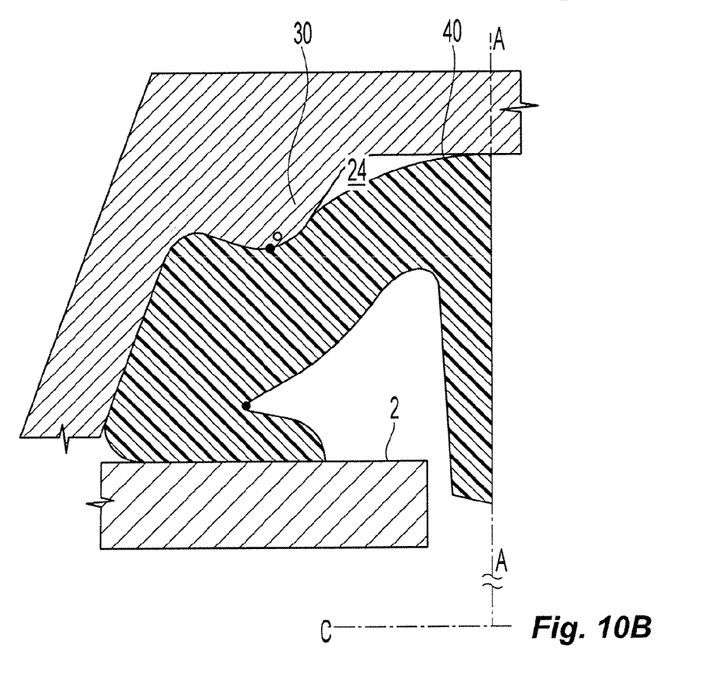
FIG. 10B is a compressed view of the arrangement of FIG. 10A.

Shown in FIGS. 9A and 9B is a known inner surface 12a of the upper housing component 12 engaged with a preferred gasket 40. Details of an alternative inner surface 12a, 14a and a preferred gasket are shown in the FIGS. 10A and 10B for use in a hinge coupling arrangement described above. Respectively shown in FIGS. 10A and 10B are uncompressed and compressed views in which a tapering inner surface 12a of a coupling housing 12 define a pair of notches 30 which compress lateral sides of a preferred gasket 40 laterally against the interior sidewalls of the housing 12. Detailed description of the gasket and the housing shown in FIGS. 10A and 10B are provided in International Application No. PCT/US10/53970, filed Oct. 25, 2010, entitled "Systems and Methods for Pipe Couplings", and which claims priority to U.S. Provisional Patent Application No. 61/255,409, entitled, "System and Methods for Pipe Couplings," filed Oct. 27, 2009, both which are incorporated by reference. Known gasket configurations may be used with the coupling assemblies described herein. For example, as shown in FIGS. 9A and 9B, standard style "C shaped" or "Tri-seal" gaskets as identified at page 12 in Tyco Fire & Suppression Products Publication IH-1000FP, entitled, "Grinnell®—Grooved Fire Protection Installation Manual" (August 2007) can be used in the preferred coupling assemblies 10, 10'. A copy of page 12 from the installation manual is included in U.S. Provisional Patent Application No. 61/255,351.

In the preferred coupling 10, 10' and its installation, as described above, the pivot fastener 22 provides at least three functions: i) it couples the housing components 12, 14 together for a pre-assembly that minimize the number of separate components for the end user; ii) the fastener 22 defines the pivot axis of the coupling 10; and iii) in the closed configuration, the fastener 22 provides for a secure hold between the housing components 12, 14 such that the user only has to properly torque one fastener 42 to form a fluid tight seal. The preferred coupling assembly 10 more specifically provides for the preferred fastener 22 that, in its axial configuration, linearly aligns the through holes 20 of the housing components 12, 14 to define the closed configuration of the coupling 10 as seen in FIG. 5B, and in its skewed configuration, defines the open configuration of the coupling 10, as seen in FIG. 5A. Shown in FIGS. 3A-3D and described above is a preferred embodiment of pivot fastener 22'. However alternative configurations of the fastener 22 and its configuration within the components 12, 14 are possible provided that the resultant fastener functions as described. For example, the fastener and the coupling could be configured to hold the coupling in the open and closed configuration with the elements of the fastener in a skewed configuration. Additionally, a fastener could be provided and the bolt pad extensions configured so as not to require the fasteners to extend through a through hole, for example one or more of the bolt pad could include a threaded blind bore for the shanks of the pivot fastener.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments, but that it has the full scope defined by the language of the following claims, and equivalents thereof.

What is claimed is:

1. A coupling for coupling two pipe segments together, the coupling comprising:
a first housing component having a first end, a second end, and an arcuate surface extending between the first and second ends of the first component;
a second housing component having a first end, a second end, and an arcuate surface extending between the first and second ends of the first component, each of the first ends of the first and second housing components having a through hole;
a fastener disposed within the through holes of the first ends of the first and second housing components so as to couple the first and second components, the fastener having a first element and a second element to define a first configuration and a second configuration of the fastener, the first configuration of the fastener includes the first and second elements of the fastener being substantially aligned such that the through holes of the first ends of the first and second components are substantially aligned so as to define an axis of alignment extending through the through holes, the second configuration of the fastener comprises the first and second elements being skewed with respect to one another about a pivot axis that extends substantially perpendicularly to the axis of alignment.

2. The coupling of claim 1, wherein the fastener comprises a first fastener and each of the second ends of the first and second housing components have a through hole, the coupling further comprising a second fastener disposed within at least one of the through holes of the second ends of the first and second components.

3. The coupling of claim 2, wherein the first fastener is in the first configuration, the arcuate surfaces of the first and second components are opposed one another to define a central axis of the coupling that extends parallel to the pivot axis.

4. The coupling of claim 3, wherein the through holes of the second ends of the first and second housing components are substantially axially aligned substantially parallel to the axis of alignment of the through holes at the first ends of the first and second housing components.

5. The coupling of claim 3, wherein the second fastener is disposed within each of the through holes at the second ends of the housing components such that the first fastener is secured in the first configuration.

6. The coupling of claim 3, wherein the second end of one of the first and second housing components defines a slot extending toward the central axis of the coupling and in communication with the through hole of the second end of the one housing components.

7. The coupling of claim 2, wherein the second fastener is disposed in only one through hole at the second end of one of the first and second housing components so that the first fastener moves between the first and second configuration and the first and second housing components pivot with respect to one another about the pivot axis.

8. The coupling of claim 1, wherein the first end of at least one of the first and second housing components includes an interior surface defining the through hole of the first end of the at least one component, the interior surface engaging a portion of the fastener so as to prevent relative rotation between the first and second components about the linear axis.

9. The coupling of claim 8, wherein the fastener includes a pin disposed along the pivot axis and which couples the first element to the second element.

10. The coupling of claim 9, wherein the pin is the portion of the fastener engaged by the interior surface of the first end of the at least one component, the interior surface defining a recess for housing the pin.

11. The coupling of claim 1, wherein each of the first and second elements of the fastener has an enlarged head portion and a shank portion depending from the head portion along a longitudinal axis of the element that extends perpendicular to the pivot axis of the fastener; the head portion of each of the first and second elements including a through hole extending along the pivot axis, a pin disposed in the through holes of each head portion of the fastener to couple the first element to the second element such that the head portions of the first and second elements engage one another.

12. The coupling of claim 11, wherein the first configuration the longitudinal axes of the first and second elements are coaxially aligned along the linear axis such that the shank portions of the first and second elements define opposed axial ends of the fastener.

13. The coupling of claim 11, wherein the head portion of the first element includes a first planar engagement surface, the head portion of the second element including a second planar engagement surface, first and second planar engagement surfaces engaging one another.

14. The coupling of claim 13, wherein the head portion of the first element includes a first planar shoulder extending perpendicular to the first planar engagement surface, and wherein further the head portion of the second element includes a second shoulder extending perpendicular to the second planar engagement surface.

15. The coupling of claim 11, wherein the shank portion of each of the first and second elements is threaded, each threaded portion being positioned within one of the through holes at the first ends of the housing components by a nut threaded about the threaded portion.

* * * * *